(12) United States Patent
Johnson et al.

(10) Patent No.: US 9,978,580 B2
(45) Date of Patent: May 22, 2018

(54) LAMPS AND LIGHT SOURCES INCLUDING RFID TAGS, AND METHODS OF ASSEMBLING AND OPERATING THE SAME

(71) Applicant: Heraeus Noblelight America LLC, Gaithersburg, MD (US)

(72) Inventors: William E. Johnson, Burke, VA (US); Robert Ervin, Gaithersburg, MD (US)

(73) Assignee: Heraeus Noblelight America LLC, Gaithersburg, MD (US)

( * ) Notice: Subject to any disclaimer, the term of this patent is extended or adjusted under 35 U.S.C. 154(b) by 0 days. days.

(21) Appl. No.: 15/356,232

(22) Filed: Nov. 18, 2016

(65) Prior Publication Data

US 2017/0154765 A1    Jun. 1, 2017

Related U.S. Application Data

(60) Provisional application No. 62/260,891, filed on Nov. 30, 2015.

(51) Int. Cl.
| H01J 61/56 | (2006.01) |
| G06K 7/10 | (2006.01) |
| G06K 19/077 | (2006.01) |
| H01J 61/02 | (2006.01) |
| H01J 65/04 | (2006.01) |
| H05B 37/02 | (2006.01) |

(52) U.S. Cl.
CPC .......... *H01J 61/56* (2013.01); *G06K 7/10366* (2013.01); *G06K 19/0776* (2013.01); *H01J 61/025* (2013.01); *H01J 65/042* (2013.01); *H04W 4/80* (2018.02); *H05B 37/02* (2013.01)

(58) Field of Classification Search
CPC ........ H01J 61/025; H01J 61/042; H01J 61/56; G06K 7/10366; G06K 19/0776
See application file for complete search history.

(56) References Cited

U.S. PATENT DOCUMENTS

| 8,785,868 B2 | 7/2014 | Yang et al. | |
| 2003/0060682 A1* | 3/2003 | Handa | A61B 1/0669 |
| | | | 600/178 |
| 2006/0149126 A1* | 7/2006 | Ertas | A61B 1/00059 |
| | | | 600/101 |
| 2007/0121323 A1 | 5/2007 | Pawlik et al. | |
| 2008/0157972 A1 | 7/2008 | Duron et al. | |
| 2008/0211427 A1* | 9/2008 | Budde | H05B 37/029 |
| | | | 315/294 |
| 2011/0006898 A1* | 1/2011 | Kruest | H01Q 1/2208 |
| | | | 340/568.1 |
| 2011/0266345 A1 | 11/2011 | Fowler et al. | |
| 2014/0313018 A1 | 10/2014 | Green et al. | |

FOREIGN PATENT DOCUMENTS

| KR | 20120033712 | 4/2012 |
| KR | 101285169 | 7/2013 |

OTHER PUBLICATIONS

International Search Report for International Patent Application No. PCT/US2016/062916, dated Feb. 6, 2017.

* cited by examiner

*Primary Examiner* — Jimmy Vu
*Assistant Examiner* — Pedro C Fernandez
(74) *Attorney, Agent, or Firm* — Stradley Ronon Stevens & Young, LLP

(57) ABSTRACT

A lamp is provided. The lamp includes a transparent envelope for emitting light, and an RFID tag coupled to a portion of the transparent envelope.

14 Claims, 9 Drawing Sheets

LAMPS AND LIGHT SOURCES INCLUDING RFID TAGS, AND METHODS OF ASSEMBLING AND OPERATING THE SAME

CROSS-REFERENCE TO RELATED APPLICATION

This application claims the benefit of U.S. Provisional Patent Application No. 62/260,891, filed Nov. 30, 2015, the content of which is incorporated herein by reference.

FIELD

The invention relates to the integration of an RFID tag and a lamp, and more particularly, to differing structures and techniques for integrating the RFID tag and the lamp.

BACKGROUND

Radiation lamps (e.g., ultraviolet radiation lamps) are used in connection with many applications such as, for example, curing of inks, adhesives, and coatings. Radio frequency identification tags (e.g., RFID tags including a semiconductor chip and an antenna) are known in the field of ultraviolet radiation systems. For example, U.S. Pat. No. 8,785,868 (which is hereby incorporated by reference in its entirety) discloses use of an RFID tag as an intelligent marker for communication with an on-lamp microprocessor, for example, as a bulb recognizer.

Unfortunately, the operating environment of an ultraviolet bulb creates substantial challenges for the use of such intelligent markers. For example, the high operating temperature (e.g., with an exemplary range of 700° C.-1000° C.) tends to cause significant damage to such an RFID tag. Likewise, such operating environments often involve high levels of ultraviolet and/or microwave radiation. Thus, adhering an RFID tag to a ultraviolet emitting bulb involves inherent challenges.

Thus, it would be desirable to provide improved systems and methods for integrating an RFID tag with such a lamp.

SUMMARY

According to an exemplary embodiment of the invention, a lamp is provided. The lamp includes a transparent envelope for emitting light, and an RFID tag secured to a portion of the transparent envelope. The RFID tag may be directly coupled to an exterior portion of the transparent envelope (e.g., attached to a nubbin of the transparent envelope using adhesive or the like). Alternatively, the RFID tag may be indirectly secured to the transparent envelope using an additional structure (e.g., an RFID tag housing as in FIGS. 2A-2C, a sleeve such as in FIG. 3, etc.). Alternatively, the RFID tag may be housed within a portion of the transparent envelope (e.g., within the nubbin as in FIGS. 4-5, etc.).

According to another exemplary embodiment of the invention, a light source is provided. The light source includes: (a) a lamp including (i) a transparent envelope for emitting light, and (ii) an RFID tag secured to a portion of the transparent envelope; (b) a radio frequency energy source for providing radio frequency energy to the lamp; and (c) an optical reflector for directing light from the lamp. The RFID tag may be secured to the portion of the transparent envelope using any technique within the scope of the invention, including but not limited to the techniques illustrated and described in connection with FIGS. 2A-2C, FIG. 3, and FIGS. 4-5.

According to another exemplary embodiment of the invention, a method of assembling a lamp is provided. The method includes the steps of: (a) providing a transparent envelope for the lamp; and (b) securing an RFID tag, for providing information related to the lamp by radio frequency communications, to the transparent envelope. The method may also include steps related to the operation of the lamp, such as a step of (c) transmitting information related to the lamp to a microprocessor using the RFID tag. The information transmitted from the RFID tag may include, for example, at least one of (i) a unique identifier of the lamp, (ii) model identification information related to the lamp, and (iii) information related to the service history of the lamp.

BRIEF DESCRIPTION OF THE DRAWINGS

The invention is best understood from the following detailed description when read in connection with the accompanying drawings. It is emphasized that, according to common practice, the various features of the drawings are not to scale. On the contrary, the dimensions of the various features are arbitrarily expanded or reduced for clarity. Included in the drawings are the following figures.

DETAILED DESCRIPTION

As used herein, the terms "processor" and "microprocessor" are used interchangeably, and shall be broadly construed to refer to any device including a processing unit (e.g., a central processing unit) or other hardware that executes computer program instructions. Examples of "processors" and "microprocessors" include microcontrollers, digital signal processors (DSPs), programmable logic controllers (PLCs), computers, etc. As is understood by those skilled in the art, "processors" and "microprocessors" may include elements such as random access memory (RAM), read only memory (ROM), and peripherals.

Figure 2A:
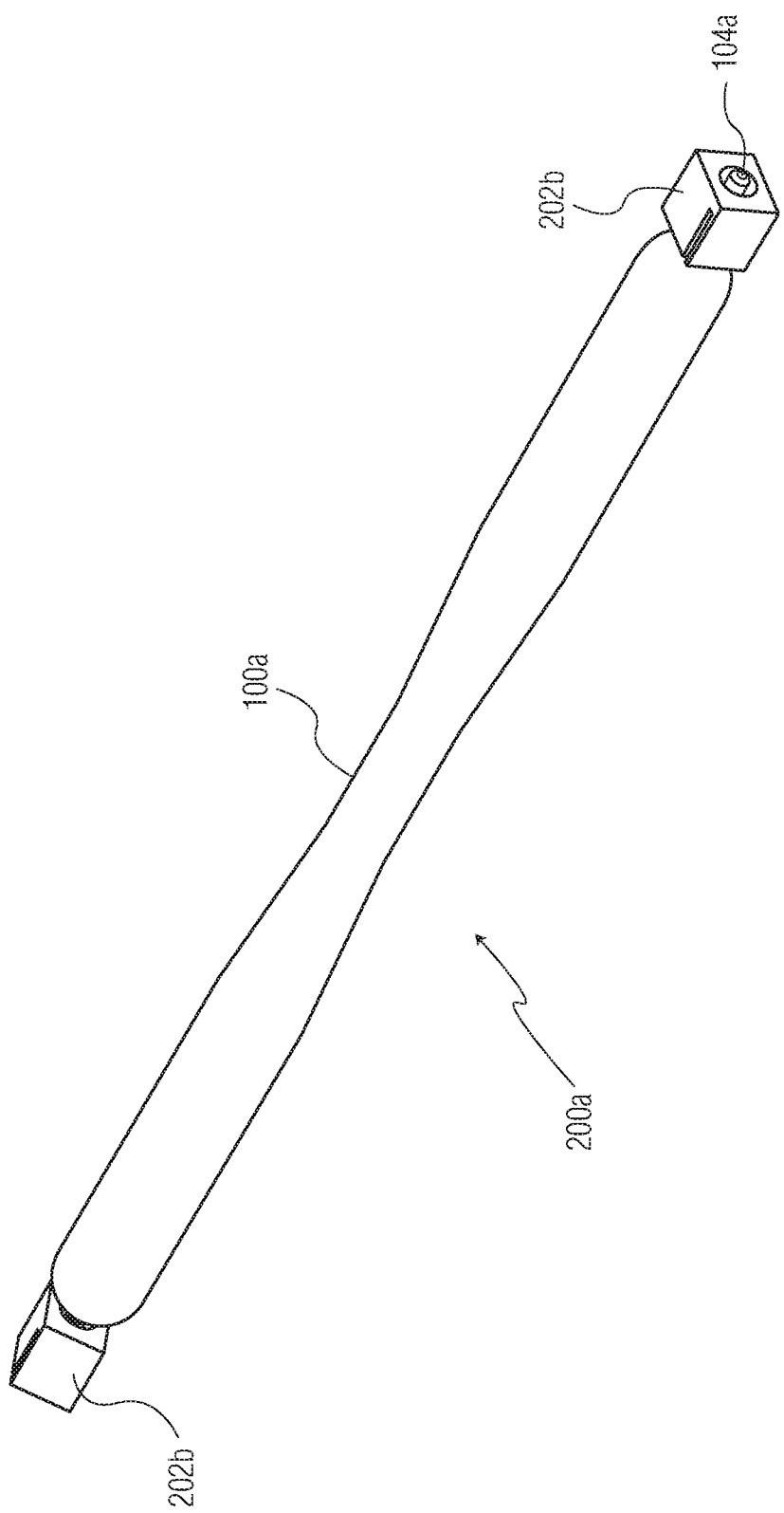
FIG. 2A is a perspective view of a lamp including two RFID tag housings in accordance with an exemplary embodiment of the invention.
Figure 2B:
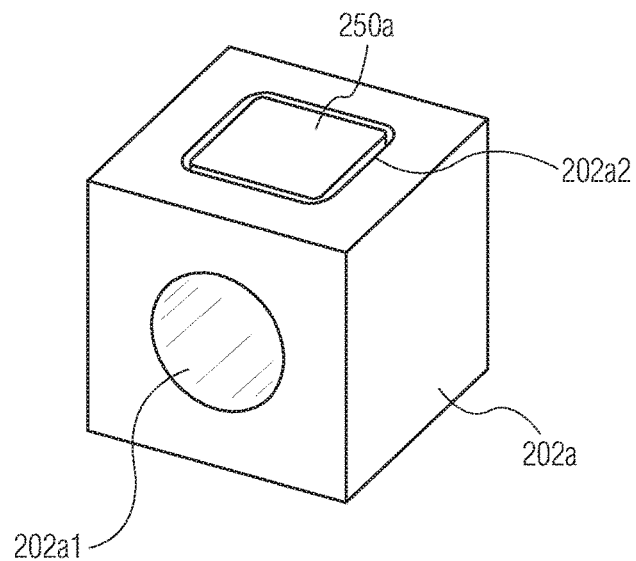
FIGS. 2B-2C are illustrations of RFID tag housings in accordance with various exemplary embodiments of the invention.
Figure 2C:
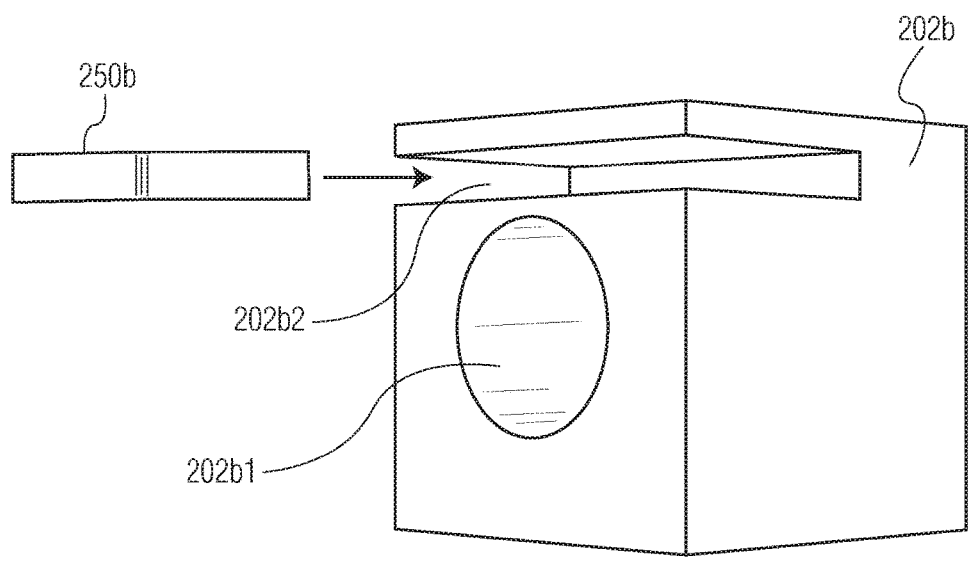
Figure 3:
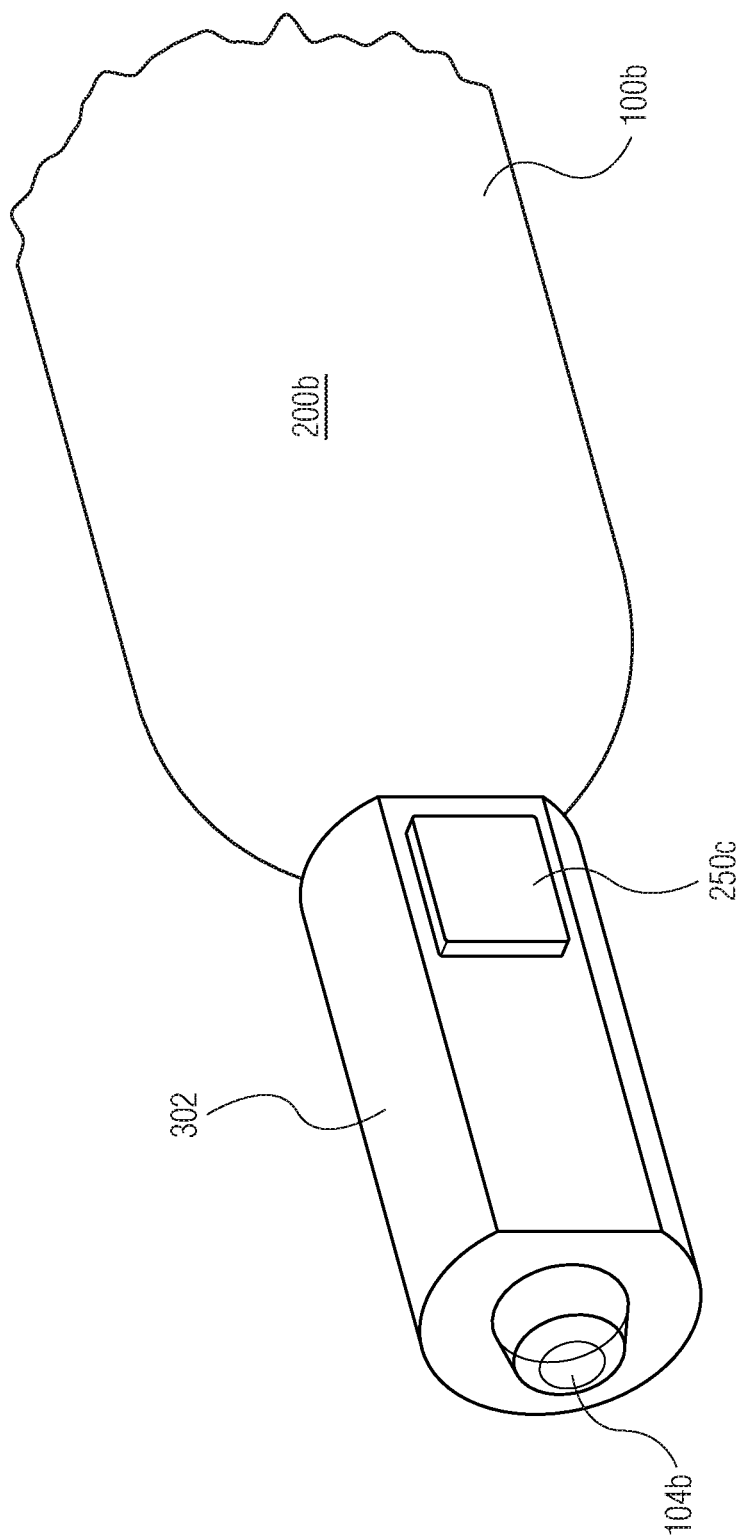
FIG. 3 is a perspective end view of a lamp, including an RFID tag secured to the lamp using a sleeve, in accordance with an exemplary embodiment of the invention.
Figure 4:
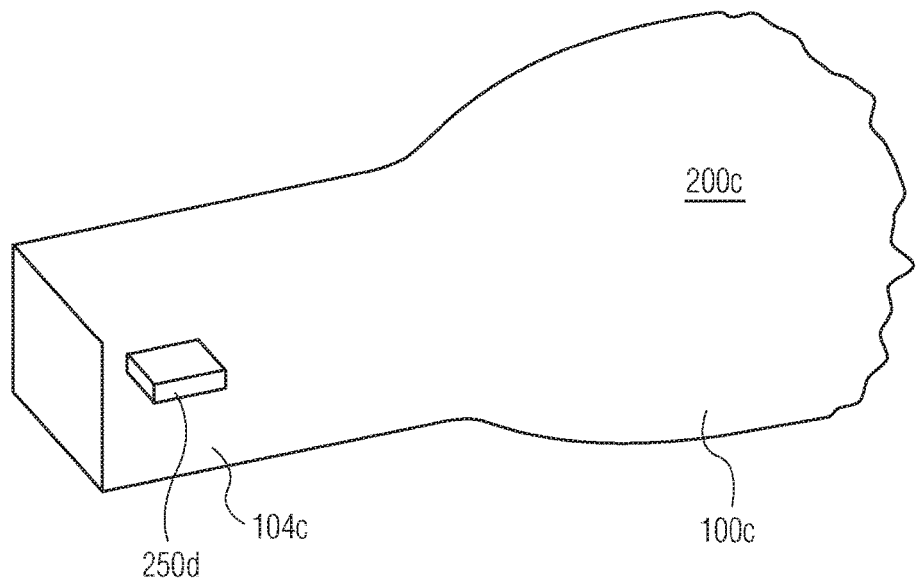
FIGS. 4-5 are perspective end views of lamps housing RFID tags in accordance with various exemplary embodiments of the invention.
Figure 5:
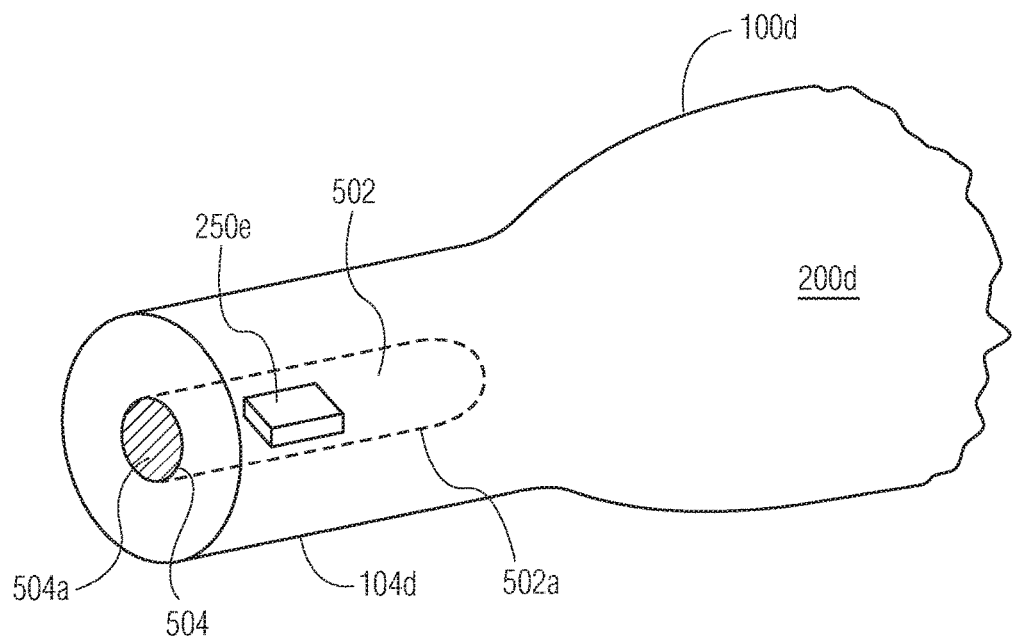

In accordance with certain exemplary embodiments of the invention, RFID tags are coupled to a portion of a transparent envelope of a lamp (e.g., directly coupled to an exterior portion of the transparent envelope, coupled to an interior portion of the transparent envelope such as in FIGS. 4-5, or indirectly coupled to an exterior portion of the transparent envelope through the use of another element such as an RFID tag housing as illustrated in FIGS. 2A-2C or a sleeve as illustrated in FIG. 3). In embodiments including an RFID tag housing formed from a UV resistant material (e.g., formed from a ceramic material such as alumina, formed from a polytetrafluorethylene (PTFE) material such as Teflon®, formed from a material including a ceramic material and a PTFE material, etc.), the RFID tag may be mounted to the RFID tag housing (e.g., in an opening of the housing) using a UV resistant adhesive (e.g., a cement adhesive), and the RFID tag housing may be secured to a nubbin end of the lamp (e.g., secured using the same UV resistant adhesive). In embodiments including a sleeve such as the "D-shaped" sleeve shown in FIG. 3 (e.g., a quartz sleeve), and the RFID tag attached to (or otherwise engaged with) the sleeve, the sleeve may be attached to the transparent envelope of a lamp using an adhesive (e.g., a cement epoxy).

Lamps according to the invention may be, for example, plasma lamps, electrodeless lamps, radio frequency powered lamps, filament lamps, and light-emitting diode (LED) lamps. Light emitted from the transparent envelope of the lamp may be visible light, ultraviolet light, a hybrid thereof, infrared light, etc.

In accordance with certain exemplary embodiments of the invention, a portion of the transparent envelope (e.g., a portion including one or both nubbins of the transparent envelope) may be coated with a non-transparent material (e.g., a reflective material). For example, a heat resistant coating (e.g., a quartz glass coating such as an opaque quartz glass coating) may be applied to a portion of the transparent envelope (e.g., the nubbins), thereby acting as a reflector to increase light transmitted through the transparent portion of the transparent envelope.

In accordance with certain exemplary embodiments of the invention, the RFID tag(s) are unique to the lamp, and includes information to uniquely identify the lamp. That is, when the lamp is changed, the RFID tags (and the associated RFID tag housing or sleeve or other structure, if provided) are also changed. By providing an RFID tag specific to the lamp, information related to the lamp may be tracked, for example: in order to manage inventory; in order to confirm authenticity of the lamp; etc. Such information may be accessed, for example, during interrogation of the RFID tag by a microprocessor.

Figure 1:
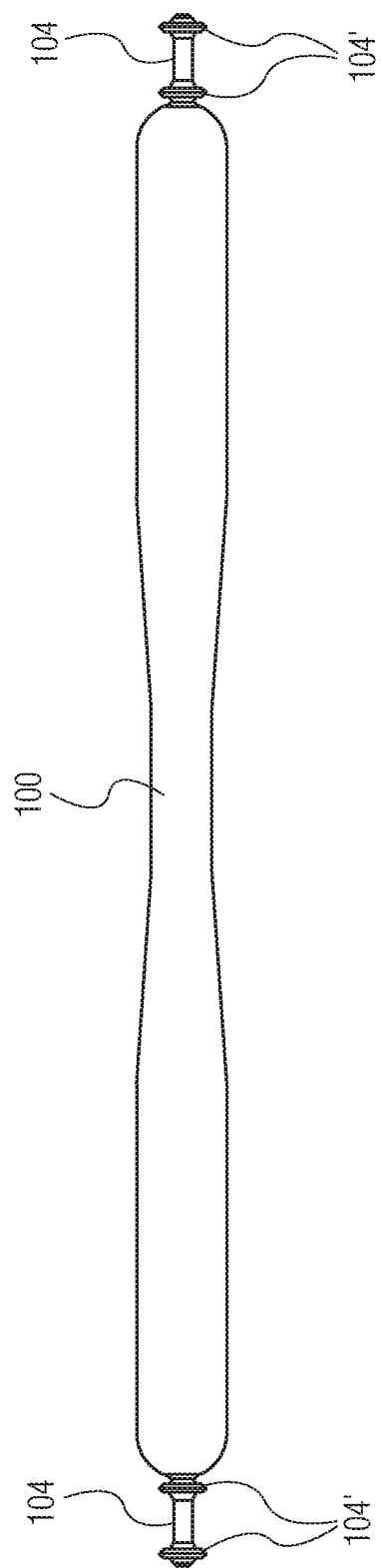
FIG. 1 is a top view of a conventional transparent envelope of a lamp.

FIG. 1 illustrates a transparent envelope 100 for emitting light, wherein each end of transparent envelope 100 includes an end portion 104 (referred to herein as nubbins 104). In the example shown in FIG. 1, each nubbin 104 includes stops 104'. Such stops may be integrated into the outer structure (e.g., glass) of transparent envelope 100, or may be structures separate from (but attached to) transparent envelope 100. In accordance with the invention, such stops may be utilized for securing an RFID tag housing (or other structure for holding an RFID tag) to transparent envelope 100.

FIG. 2A illustrates a lamp 200a including a transparent envelope 100a, and two RFID tag housings 202b coupled to respective nubbins 104a of lamp 200a. An RFID tag (not shown in FIG. 2A) is provided in each of RFID tag housings 202b, where each of the RFID tags is configured to provide information (e.g. by way of radio frequency transmission to a microprocessor, such as described in connection with FIG. 6C) related to lamp 200a. The information provided may include (i) a unique identifier of the lamp, for example, to ensure authenticity of a lamp, (ii) model identification information related to the lamp such as a serial number or manufacturing specifications, and (iii) information related to the service history of the lamp such as the number of hours of operation.

FIGS. 2B-2C illustrate exemplary RFID tag housings which may be coupled to nubbin portions of a lamp (e.g., such as RFID tag housings 202b shown in FIG. 2A). Referring specifically to FIG. 2B, RFID tag housing 202a defines aperture 202a1 configured to receive (or otherwise become engaged with) a nubbin end portion of a lamp. An upper surface of RFID tag housing 202a defines opening 202a2 configured to receive RFID tag 250a. Referring specifically to FIG. 2C, RFID tag housing 202b defines aperture 202b1 configured to receive (or otherwise become engaged with) a nubbin end portion of a lamp. An opening 202b2 (e.g., a slot), defined by RFID tag housing 202b, is configured to receive an RFID tag 250b. In connection with the invention, it may be desirable to use an adhesive (e.g., a cement adhesive or any other appropriate adhesive): (i) to secure an RFID tag in an opening (e.g., such as openings 202a2 in FIG. 2B, 202b2 in FIG. 2C) defined by an RFID tag housing; and/or (ii) as a sealant to seal the opening after insertion of an RFID tag into the opening.

Referring to FIG. 3, an end portion of a lamp 200b including a transparent envelope 100b is illustrated. An RFID sleeve 302 (e.g., a quartz sleeve) is engaged with a nubbin 104b of lamp 200b, where an RFID tag 250c is secured (e.g., using an adhesive or the like) to a flat (or substantially flat or planar) surface of RFID sleeve 302. An aperture of RFID sleeve 302 receives nubbin 104b. An adhesive (e.g., a cement, an epoxy, etc.) may be used to secure RFID sleeve 302 to nubbin 104b. Of course, such sleeves 302 (with corresponding RFID tags 250c) may be provided on each end of lamp 100b, if desired.

While certain exemplary embodiments of the invention are described in this application in connection with an RFID tag included within an RFID tag housing (e.g., with the RFID tag housing coupled to a nubbin of a lamp such as in FIGS. 2A-2C), or an RFID tag secured to an RFID sleeve (e.g., such as in FIG. 3), the invention is not limited thereto. For example, in accordance with the invention, an RFID tag may be directly coupled to a portion of the lamp (either the interior, or the exterior of the lamp) without an RFID tag housing. For example, an RFID tag may be directly secured (using an adhesive or the like) to an exterior portion of the transparent envelope of the lamp, to an exterior portion of a nubbin of the lamp, etc. FIGS. 4-5 are non-limiting examples of configuration where an RFID tag is secured within the lamp. Referring specifically to FIG. 4, an end portion of a lamp 200c including a transparent envelope 100c is illustrated. An RFID tag 250d is housed within a nubbin 104c of lamp 200c. RFID tag 250d is inserted into nubbin 104c, and a pinch seal is formed such that RFID tag 250d is sealed within nubbin 104c. Referring specifically to FIG. 5, an end portion of a lamp 200d including a transparent envelope 100d is illustrated. An RFID tag 250e is housed within a nubbin 104d of lamp 200d. RFID tag 250e is inserted into an aperture 502 (defined by interior wall 502a) of nubbin 104d, and an end opening 504 of aperture 502 is sealed with a sealant 504a. The interior wall 502a of aperture 502 may be colored (e.g., with a pigment) to block UV light from transmission to the location of RFID tag 250e. Of course, RFID tags 250d, 250e may be provided on each end of the respective lamp 100c, 100d, if desired.

Figure 6A:
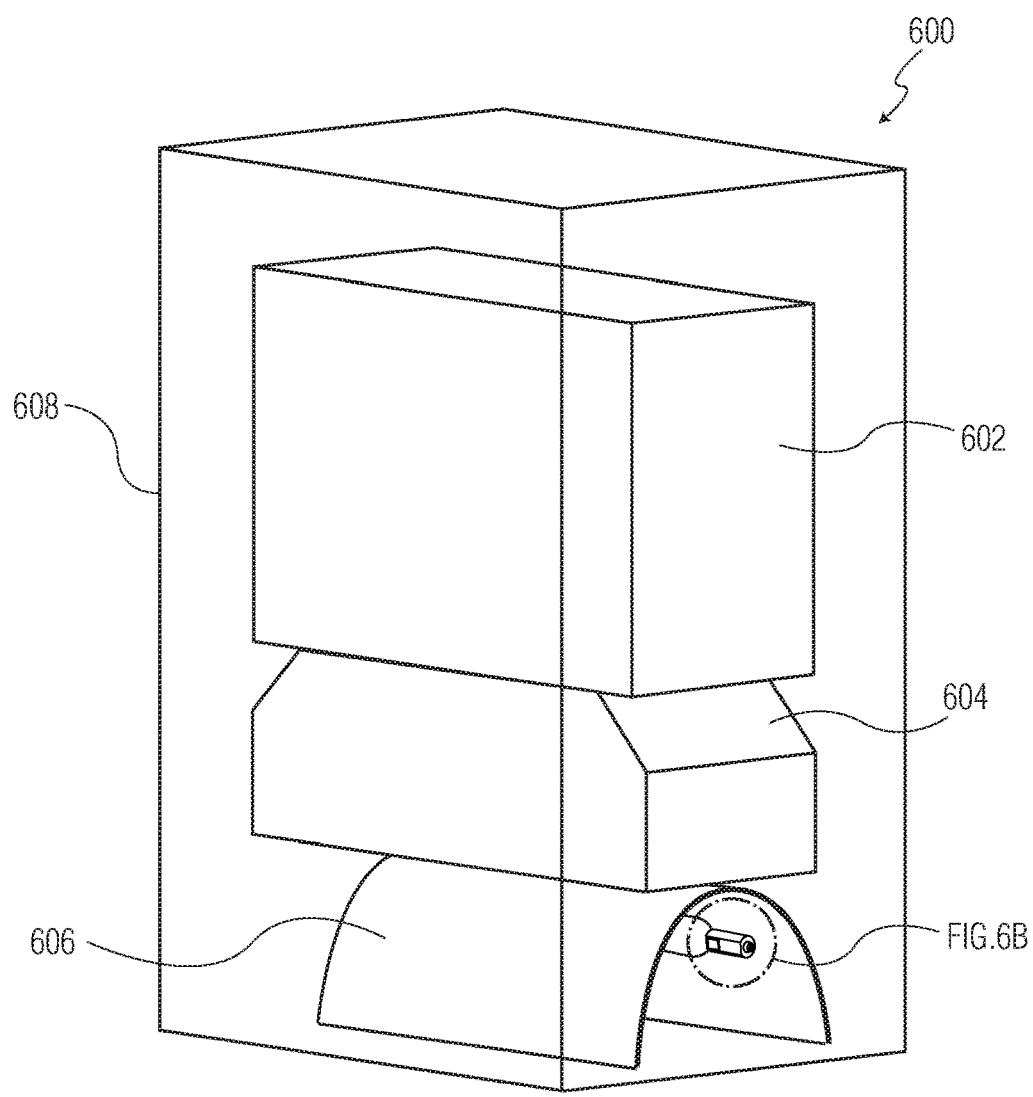
FIG. 6A is an interior block diagram perspective view of a light source in accordance with an exemplary embodiment of the invention.

While FIGS. 2A-2C and FIGS. 3-5 illustrate lamps according to various exemplary embodiments of the invention, any of those lamps (or other lamps within the scope of the invention) may be included in a light source according to the invention. FIG. 6A illustrates a light source 600 (e.g., an ultraviolet light source) including a housing 608. Within housing 608, light source 600 includes energy source 602 (e.g., one or more magnetrons) for providing microwave energy to a waveguide(s) 604. Waveguide 604 receives microwave energy from energy source 602, and directs the microwave energy to reflector assembly 606. The absorption of microwave energy by lamp 100b results in the generation of plasma energy useful for curing, drying, and other applications of light source 600.

Figure 6B:
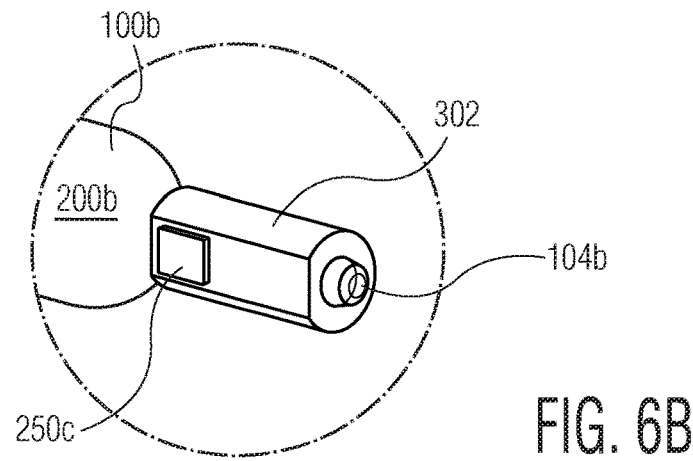
FIG. 6B is a detailed view of a portion of the light source of FIG. 6A.

FIG. 6B illustrates details of a lamp 200b including a transparent envelope 100b. As described above in connection with FIG. 3, an RFID sleeve 302 is secured to nubbin 104b (e.g., including an adhesive) of lamp 200b. RFID tag 250c is secured to a flat surface of RFID sleeve 302. Of course, light source 600 may include any type of lamp, including any configuration of RFID tag(s), within the scope of the invention. Lamp 200b (as shown in FIG. 3) is simply an exemplary lamp for inclusion in light source 600.

Figure 6C:
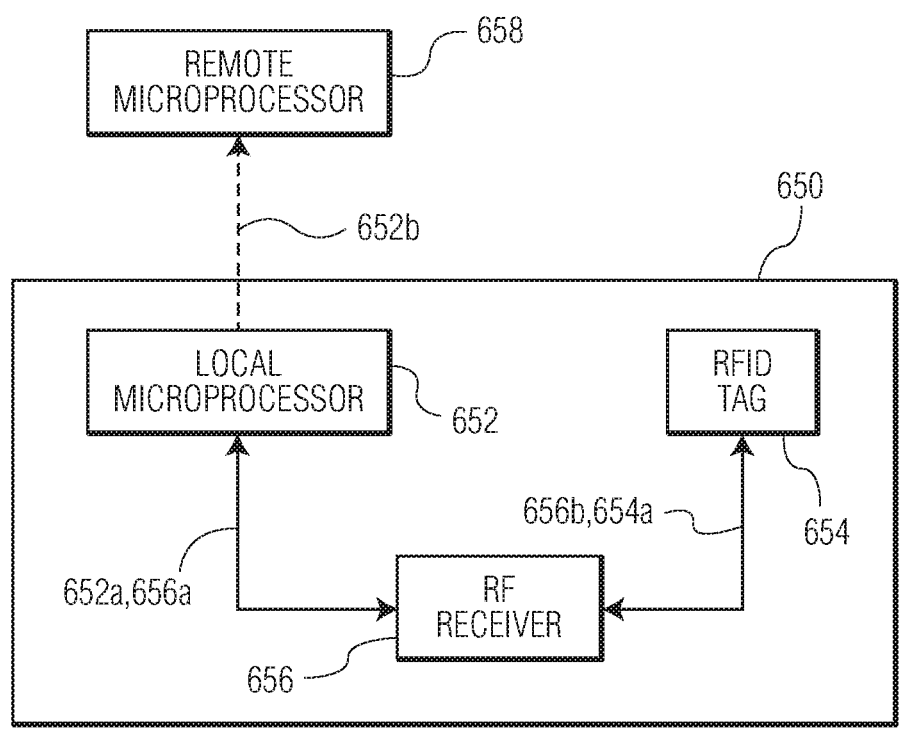
FIG. 6C is a block diagram of elements of a light source, and transmission of information between elements of the light source, in accordance with exemplary embodiments of the invention.

FIG. 6C is a block diagram of elements of a light source 650, and transmission of information between elements of light source 650. For example, light source 650 may be a light source similar to light source 600 illustrated in FIG. 6A, or other light sources within the scope of the invention. Light source 650 includes a local microprocessor 652 which interrogates one or more RFID tags. Such RFID tags may be tags such as tags 250a, 250b, 250c, 250d, or 250e illustrated and described herein, or other RFID tags within the scope of the invention.

Referring specifically to FIG. 6C, local microprocessor 652 sends a signal 652a to radio frequency (RF) receiver 656 (which may be considered a "transceiver" 656 in certain embodiments of the invention). Radio frequency (RF) receiver 656 sends a signal 656b to RFID tag 654 (e.g., to "wake up" RFID tag 654). RFID tag 654 sends data transmission 654a (via radio frequency transmission) back to radio frequency (RF) receiver 656. For example, the data included in data transmission 654a may include, for example: (i) a unique identifier of the lamp to which RFID tag 654 is secured; (ii) model identification information (e.g., serial number, manufacturing specifications, etc.) related to the lamp to which RFID tag 654 is secured; and (iii) information related to the service history of the lamp to which RFID tag 654 is secured, such as the number of hours of operation. RF receiver 656 sends data transmission 656a (e.g., including the aforementioned data) to local microprocessor 652. For example, RF receiver 656 may include a wired connection (e.g., an RS 485 communication wired connection or other wire connection) to local microprocessor 652. Local microprocessor 652 may send a data transmission 652b (e.g., including the aforementioned data) to a remote microprocessor 658 (away from light source 650) such that remote microprocessor may use the aforementioned data, as desired.

Figure 7:
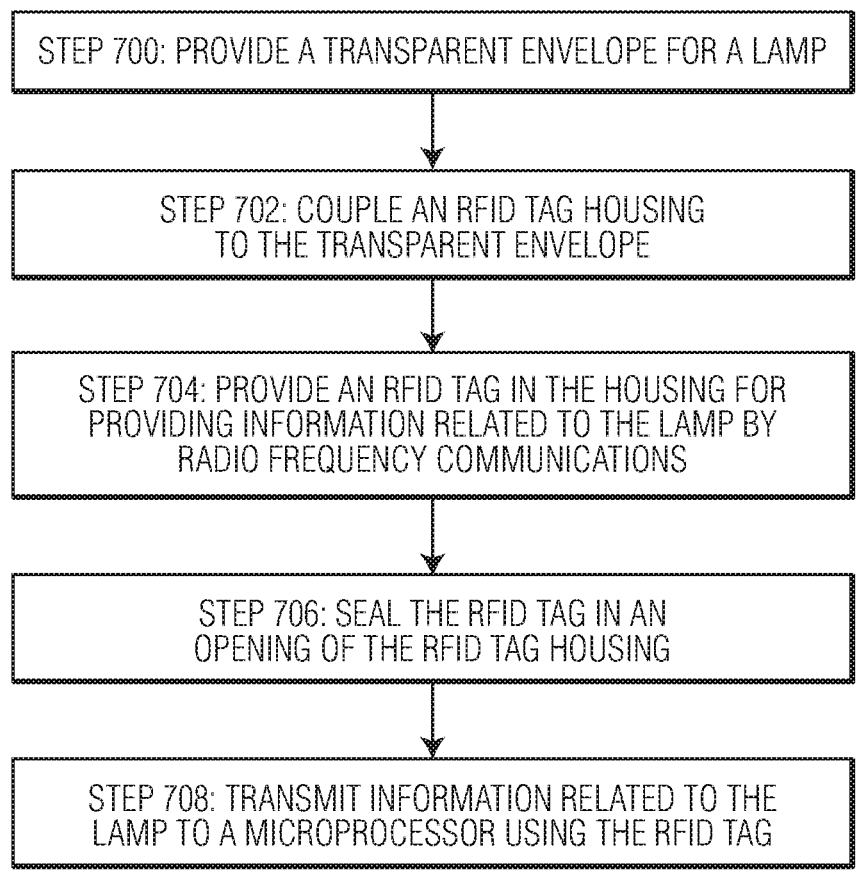
FIGS. 7-9 are flow diagrams illustrating methods of assembling a lamp, and methods of operating an RFID tag included with the lamp, in accordance with various exemplary embodiment of the invention.
Figure 8:
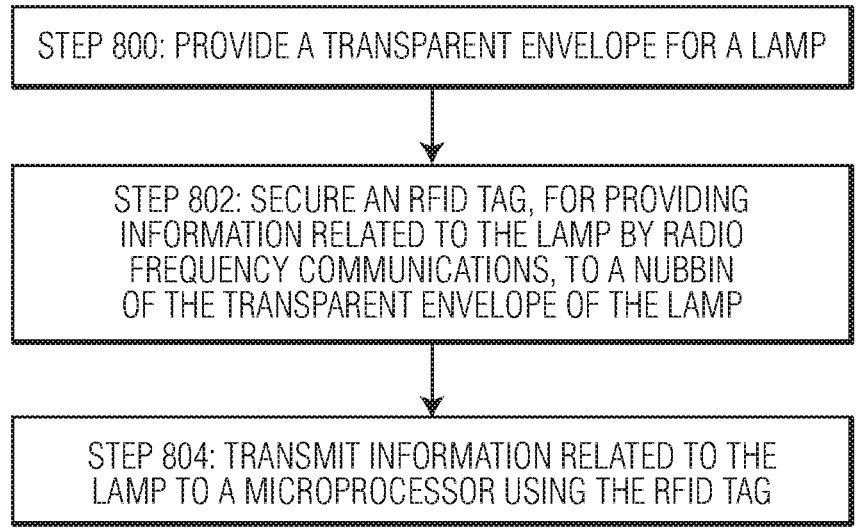
Figure 9:
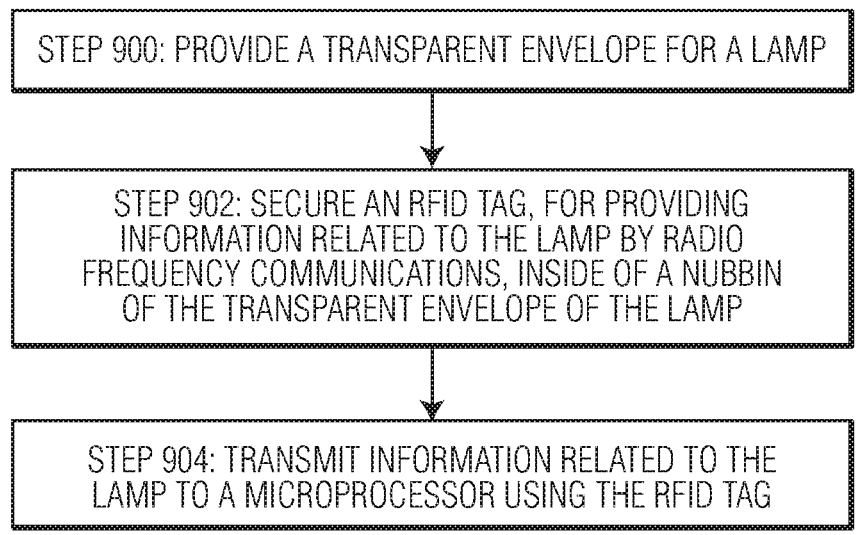

FIGS. 7-9 are flow diagrams in accordance with certain exemplary embodiments of the invention. As is understood by those skilled in the art, certain steps included in the flow diagrams may be omitted; certain additional steps may be added; and the order of the steps may be altered from the order illustrated.

Referring specifically to the flow diagram in FIG. 7, a method of assembling a lamp, and of operating an RFID tag included with the lamp, is provided. At step 700, a transparent envelope for a lamp is provided (e.g., such as the transparent envelope shown in FIG. 2A). At step 702, an RFID tag housing is coupled to the transparent envelope (e.g., using an adhesive cement). The RFID tag housing may be coupled to the transparent envelope during formation of the transparent envelope, or after formation of the transparent envelope. At step 704, an RFID tag is provided (inserted into an opening, such as the openings in FIGS. 2B-2C) in the housing for providing information related to the lamp by radio frequency communications. At step 706, the RFID tag in sealed in an opening of the RFID tag housing. For example, after the RFID tag is inserted into an opening of the RFID tag housing, the opening may be sealed using a sealant (e.g., an adhesive cement, which may be UV resistant). At step 708, information related to the lamp (which information may be encrypted on the RFID tag) is transmitted to a microprocessor using the RFID tag (e.g., in response to interrogation by the microprocessor)—for example, using a process such as described herein in connection with FIG. 6C.

Although FIG. 7 illustrates methods involving RFID tag housings (such as shown in FIGS. 2A-2C), the methods may also be applied to embodiments of the invention where the RFID tag is otherwise secured to the lamp (e.g., as in the embodiments shown in FIGS. 3-5). In connection with such embodiments, steps from FIG. 7 (such as steps 702, 704, and 706) may be adjusted to remove inclusion of an RFID tag housing.

Referring specifically to the flow diagram in FIG. 8, an additional method of assembling a lamp, and of operating an RFID tag included with the lamp, is provided. At step 800, a transparent envelope for a lamp is provided (e.g., such as the transparent envelope shown in FIG. 2). At step 802, an RFID tag (for providing information related to the lamp by radio frequency communication) is secured to a nubbin of the transparent envelope. For example, such an RFID tag may be secured directly to the nubbin (e.g., using an adhesive cement), or may be secured to the nubbin using an intermediate structure (e.g., the sleeve shown in FIG. 3). At step 804, information related to the lamp (which information may be encrypted on the RFID tag) is transmitted to a microprocessor using the RFID tag (e.g., in response to interrogation by the microprocessor)—for example, using a process such as described herein in connection with FIG. 6C.

Referring specifically to the flow diagram in FIG. 9, an additional method of assembling a lamp, and of operating an RFID tag included with the lamp, is provided. At step 900, a transparent envelope for a lamp is provided (e.g., such as the transparent envelope shown in FIG. 2). At step 902, an RFID tag (for providing information related to the lamp by radio frequency communication) is provided inside of a nubbin of the lamp. For example, such an RFID tag may be secured inside of the nubbin using one of the techniques shown in FIGS. 4-5, or other techniques. At step 904, information related to the lamp (which information may be encrypted on the RFID tag) is transmitted to a microprocessor using the RFID tag (e.g., in response to interrogation by the microprocessor)—for example, using a process such as described herein in connection with FIG. 6C.

Various benefits may be provided by lamps and light sources in accordance with the invention. One exemplary benefit is that the RFID tag housing, RFID sleeve, or other structure between the RFID tag and the transparent envelope of the lamp, may provide a thermal barrier and/or a UV barrier to the lamp (e.g., a plasma bulb), thereby improving the life of the RFID tag, while allowing for radio frequency communication from the RFID tag to its host. Another exemplary benefit is that, by locating the RFID tag(s) at a nubbin end of the lamp, transmission of photons (e.g., UV photons) from the transparent envelope is not substantially inhibited. Another exemplary benefit is that a reliable mechanism of securing an RFID tag to a lamp is provided.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A lamp comprising:
   a transparent envelope bulb for emitting light, the transparent envelope bulb having an elongate shape extending between a first end portion and a second end portion;
   a first RFID tag housing secured to a portion of the transparent envelope bulb at the first end portion, the first RFID tag housing including a first quartz sleeve engaged with the first end portion;
   a second RFID tag housing secured to a portion of the transparent envelope bulb at the second end portion, the second RFID tag housing including a second quartz sleeve engaged with the second end portion;
   a first RFID tag engaged with the first RFID tag housing; and
   a second RFID tag engaged with the second RFID tag housing,
   wherein each of the first RFID tag and the second RFID tag includes information to uniquely identify the lamp.

2. The lamp of claim 1 wherein the information included in at least one of the first RFID tag and the second RFID tag includes at least one of (i) a unique identifier of the lamp, (ii) model identification information related to the lamp, and (iii) information related to the service history of the lamp.

3. The lamp of claim 2 wherein at least one of the first RFID tag and the second RFID tag is configured to provide the information by way of radio frequency transmission to a microprocessor.

4. The lamp of claim 1 wherein the first RFID tag is secured to the first quartz sleeve, and the second RFID tag is secured to the second quartz sleeve.

5. The lamp of claim 4 wherein the first quartz sleeve is secured to the first end portion using an adhesive, and the second quartz sleeve is secured to the second end portion using an adhesive.

6. The lamp of claim 4 wherein the first RFID tag is secured to a substantially planar portion of the first quartz sleeve, and the second RFID tag is secured to a substantially planar portion of the second quartz sleeve.

7. A light source comprising:
   (a) a lamp including (i) a transparent envelope bulb for emitting light, the transparent envelope bulb having an elongate shape extending between a first end portion and a second end portion, (ii) a first RFID tag housing including a first quartz sleeve secured to a portion of the transparent envelope bulb at the first end portion; (iii) a second RFID tag housing including a second quartz sleeve secured to a portion of the transparent envelope bulb at the second end portion; (iv) a first RFID tag engaged with the first RFID tag housing; and (v) a second RFID tag engaged with the second RFID tag housing; wherein each of the first RFID tag and the second RFID tag includes information to uniquely identify the lamp;
   (b) a microwave energy source for providing microwave energy to be absorbed by the lamp, thereby generating plasma energy; and
   (c) an optical reflector for directing the plasma energy from the lamp.

8. The light source of claim 7 wherein the information included in at least one of the first RFID tag and the second RFID tag includes at least one of (i) a unique identifier of the lamp, (ii) model identification information related to the lamp, and (iii) information related to the service history of the lamp.

9. The light source of claim 8 wherein at least one of the first RFID tag and the second RFID tag is configured to provide the information by way of radio frequency transmission to a microprocessor.

10. The light source of claim 7 wherein the first RFID tag is secured to the first quartz sleeve, and the second RFID tag is secured to the second quartz sleeve.

11. The light source of claim 10 wherein the first quartz sleeve is secured to the first end portion using an adhesive, and the second quartz sleeve is secured to the second end portion using an adhesive.

12. The light source of claim 10 wherein the first RFID tag is secured to a substantially planar portion of the first quartz sleeve, and the second RFID tag is secured to a substantially planar portion of the second quartz sleeve.

13. A method of assembling a lamp, the method comprising the steps of:
   (a) providing a transparent envelope bulb for the lamp, the transparent envelope bulb having an elongate shape extending between a first end portion and a second end portion;
   (b1) securing a first RFID tag housing, for providing information related to the lamp by radio frequency communications, to the transparent envelope bulb at the first end portion, the first RFID tag housing including a first quartz sleeve;
   (b2) securing a second RFID tag housing, for providing information related to the lamp by radio frequency communications, to the transparent envelope bulb at the second end portion, the second RFID tag housing including a second quartz sleeve;
   (c1) engaging a first RFID tag with the first RFID tag housing, the first RFID tag including information to uniquely identify the lamp; and
   (c2) engaging a second RFID tag with the second RFID tag housing, the second RFID tag including information to uniquely identify the lamp.

14. The method of claim 13 further comprising the step of:
   (d) transmitting information related to the lamp to a microprocessor using at least one of the first RFID tag and the second RFID tag.

* * * * *